(12) United States Patent
Campagnolo

(10) Patent No.: US 6,641,494 B1
(45) Date of Patent: Nov. 4, 2003

(54) BICYCLE FRONT DERAILLEUR FORK AND DERAILLEUR COMPRISING THIS FORK

(75) Inventor: Valentino Campagnolo, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 09/599,424

(22) Filed: Jun. 22, 2000

(30) Foreign Application Priority Data

Aug. 26, 1999 (IT) .......................................... TO99A0729

(51) Int. Cl.[7] ................................................ F16H 63/00
(52) U.S. Cl. ........................................ 474/80; 474/81
(58) Field of Search ............................. 474/80, 81, 82, 474/83; 280/260, 261

(56) References Cited

U.S. PATENT DOCUMENTS

| | | | | | |
|---|---|---|---|---|---|
| 4,078,444 A | * | 3/1978 | Huret | .......................... | 74/240 |
| 4,223,562 A | * | 9/1980 | Nagano et al. | ................ | 474/82 |
| 4,330,137 A | * | 5/1982 | Nagano | ...................... | 280/238 |
| 4,479,787 A | * | 10/1984 | Bonnard | ...................... | 474/82 |
| 4,734,083 A | * | 3/1988 | Nagano | ........................ | 474/78 |
| 5,312,301 A | * | 5/1994 | Kobayashi | ................... | 474/80 |
| 5,624,336 A | * | 4/1997 | Kojima | ......................... | 474/82 |
| 5,782,714 A | * | 7/1998 | Osgood | ....................... | 474/144 |

* cited by examiner

Primary Examiner—Thomas R. Hannon
Assistant Examiner—Vicky A. Johnson
(74) Attorney, Agent, or Firm—Volpe and Koenig, P.C.

(57) ABSTRACT

A forked member for a bicycle front derailleur is provided on the inside face of its outer plate with an extra plate, preferably made of a plastic with a low coefficient of friction, that locally reduces the gap between the two plates of the forked member, in order to ensure the correct shifting of the chain from a smaller-diameter chainring to a larger-diameter chainring.

31 Claims, 6 Drawing Sheets

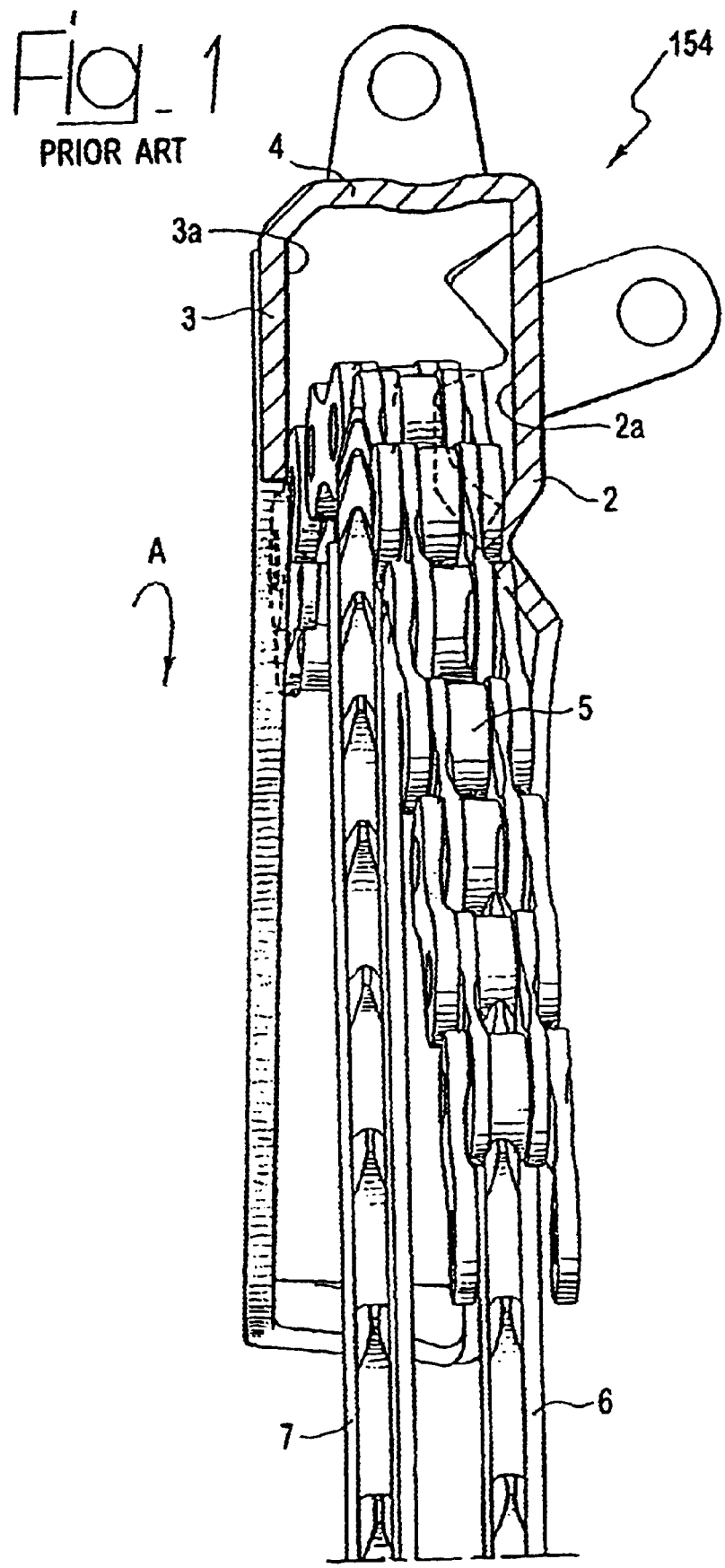
Fig_1 PRIOR ART

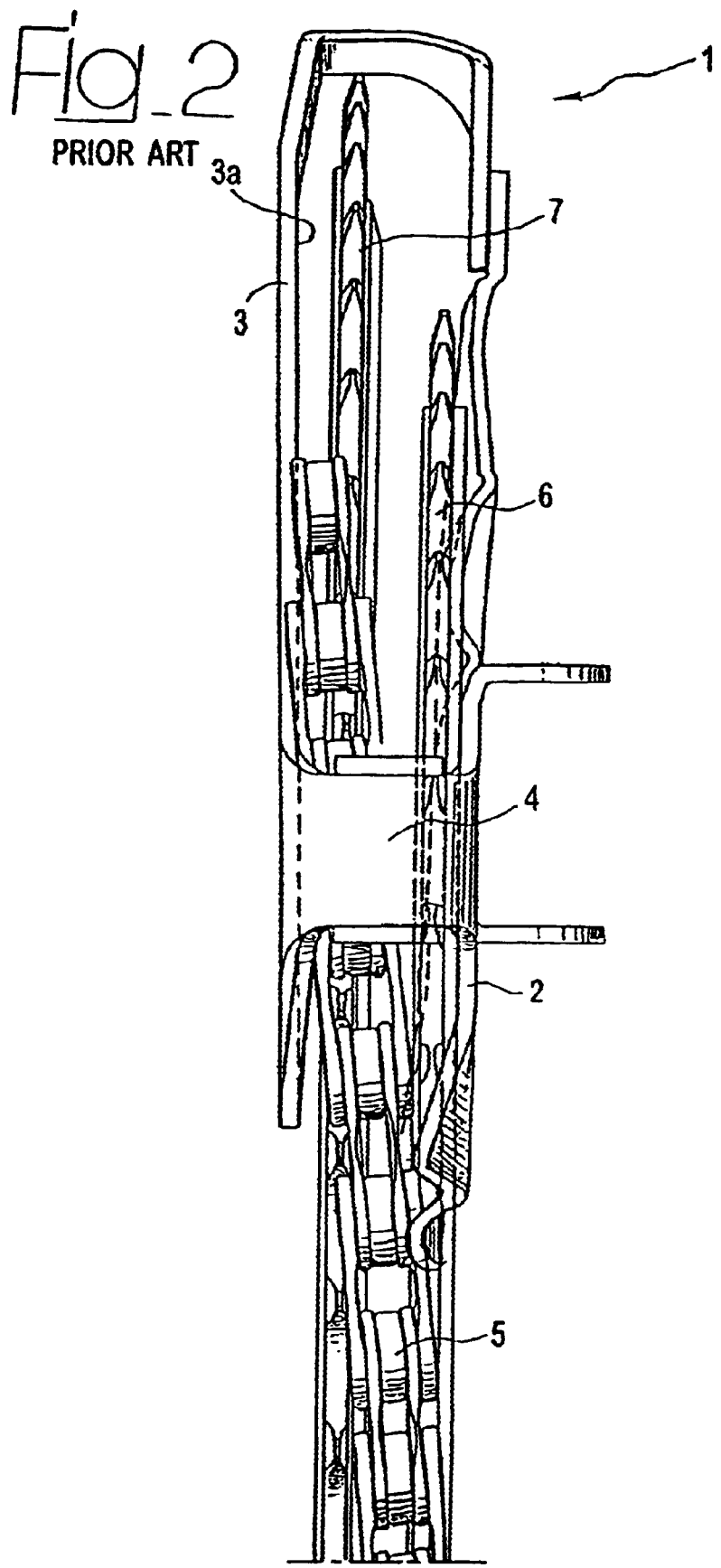

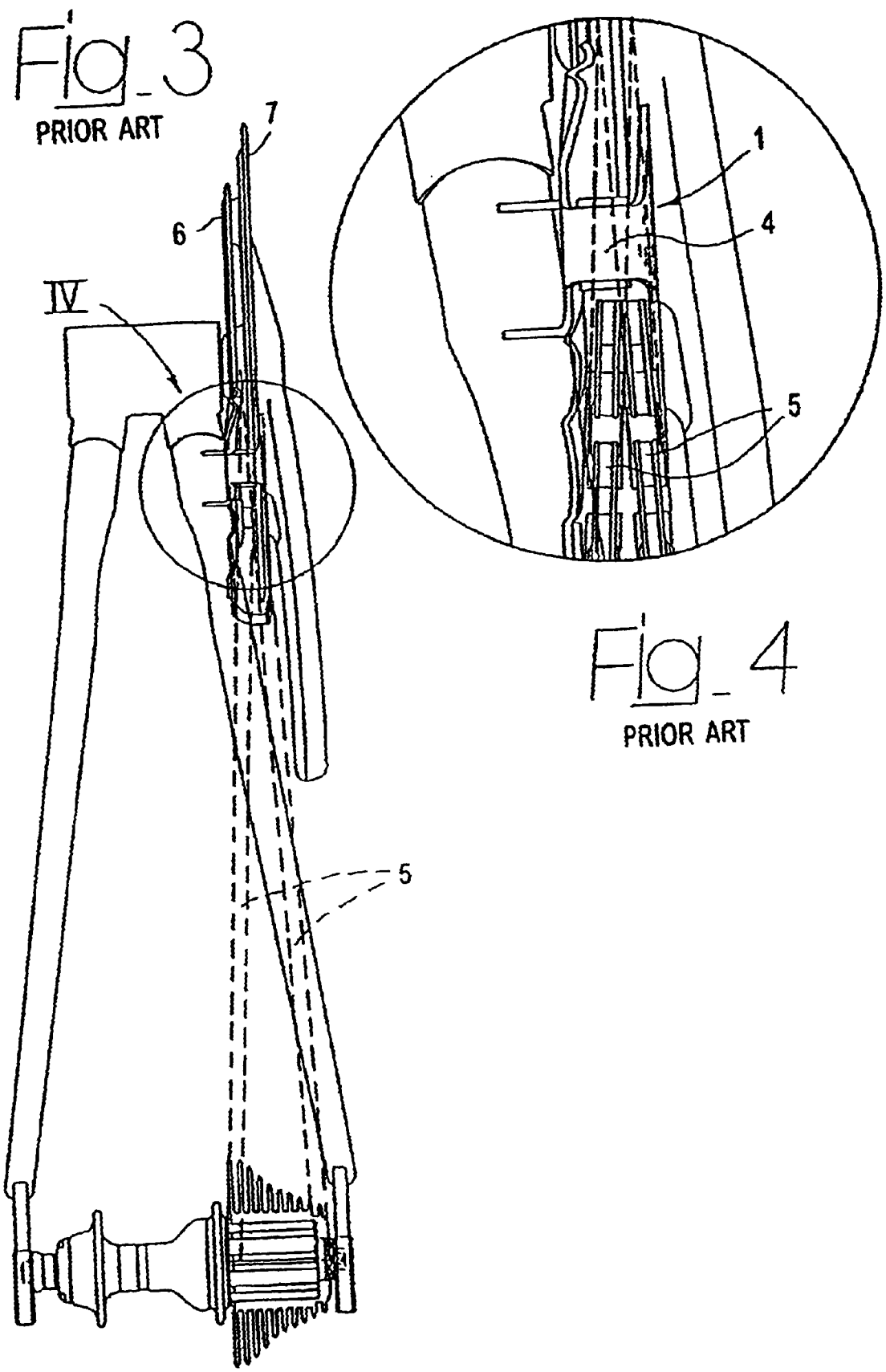

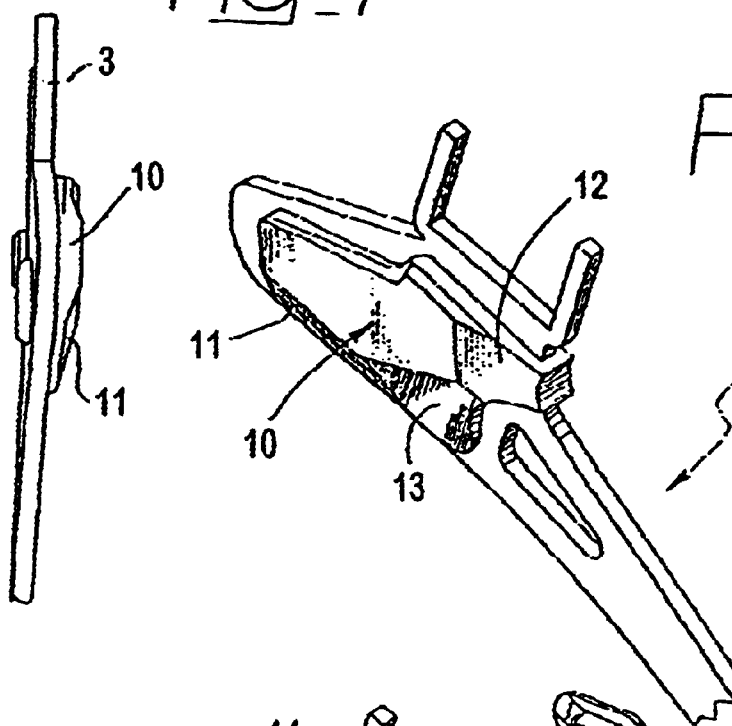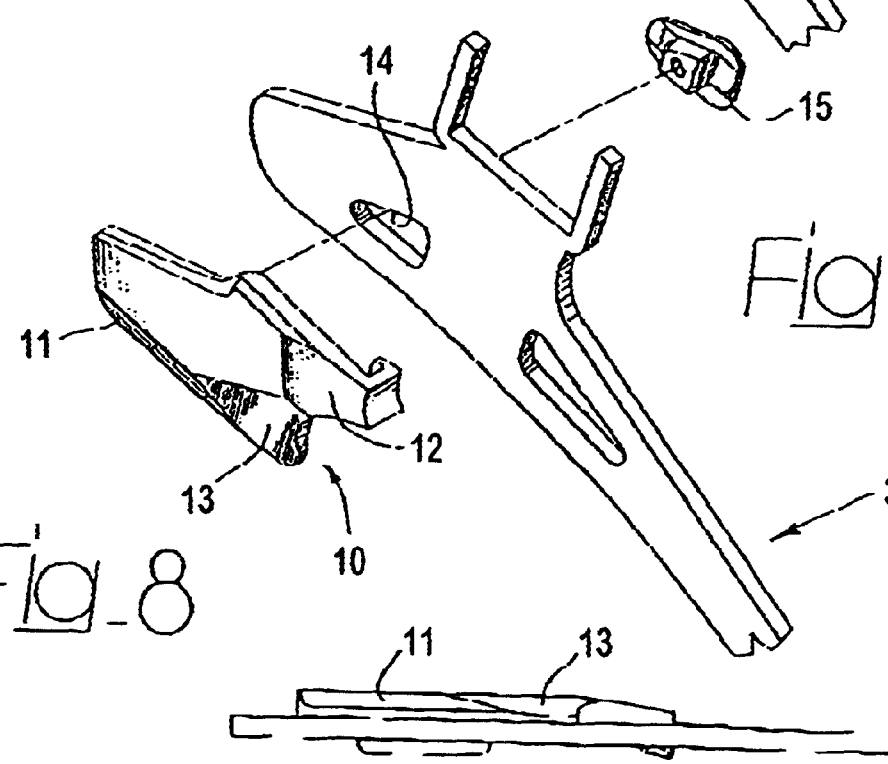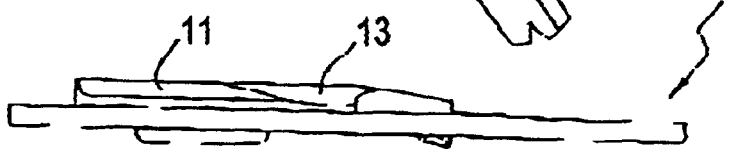

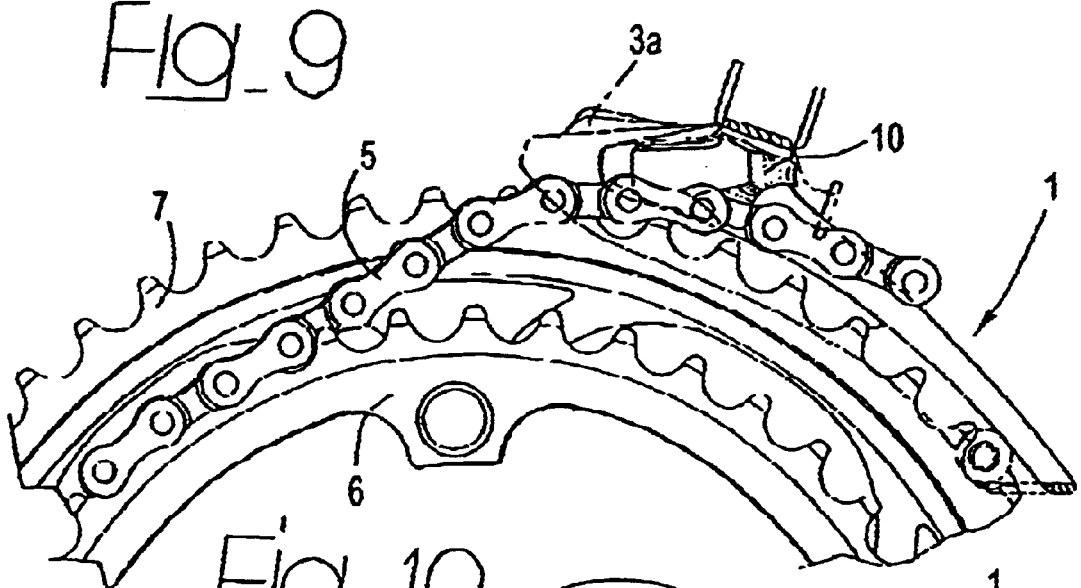
Fig_9
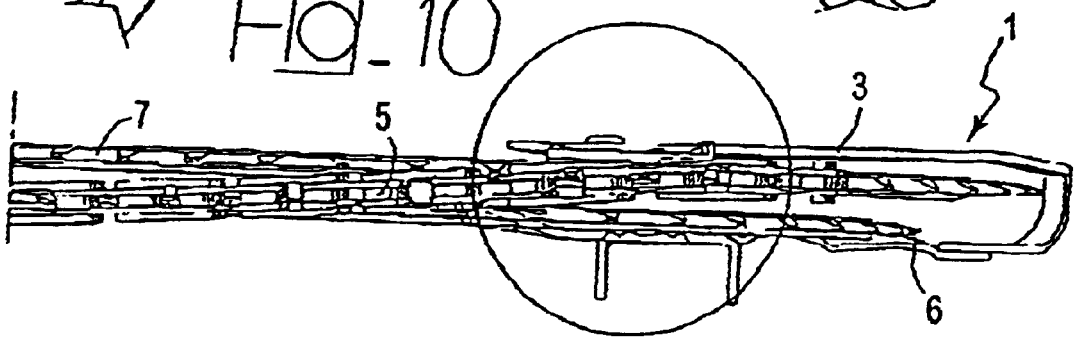
Fig_10
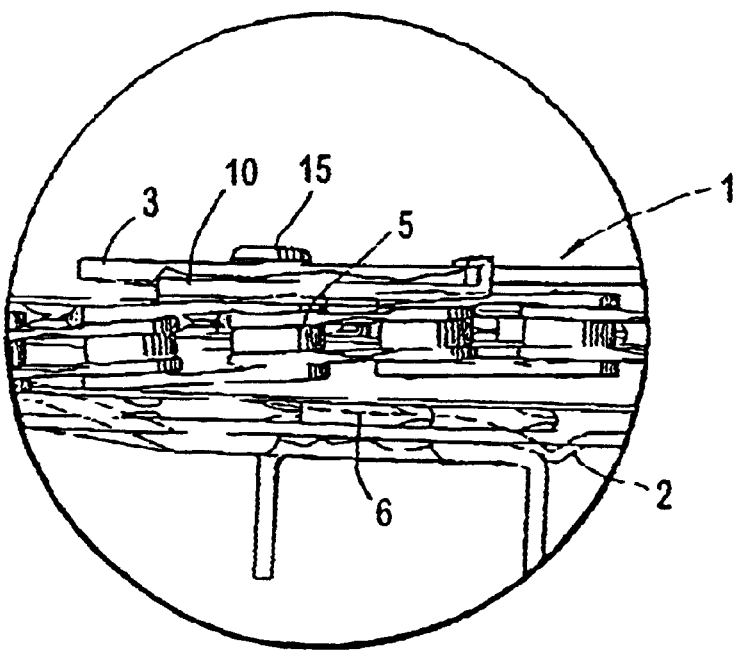
Fig_11

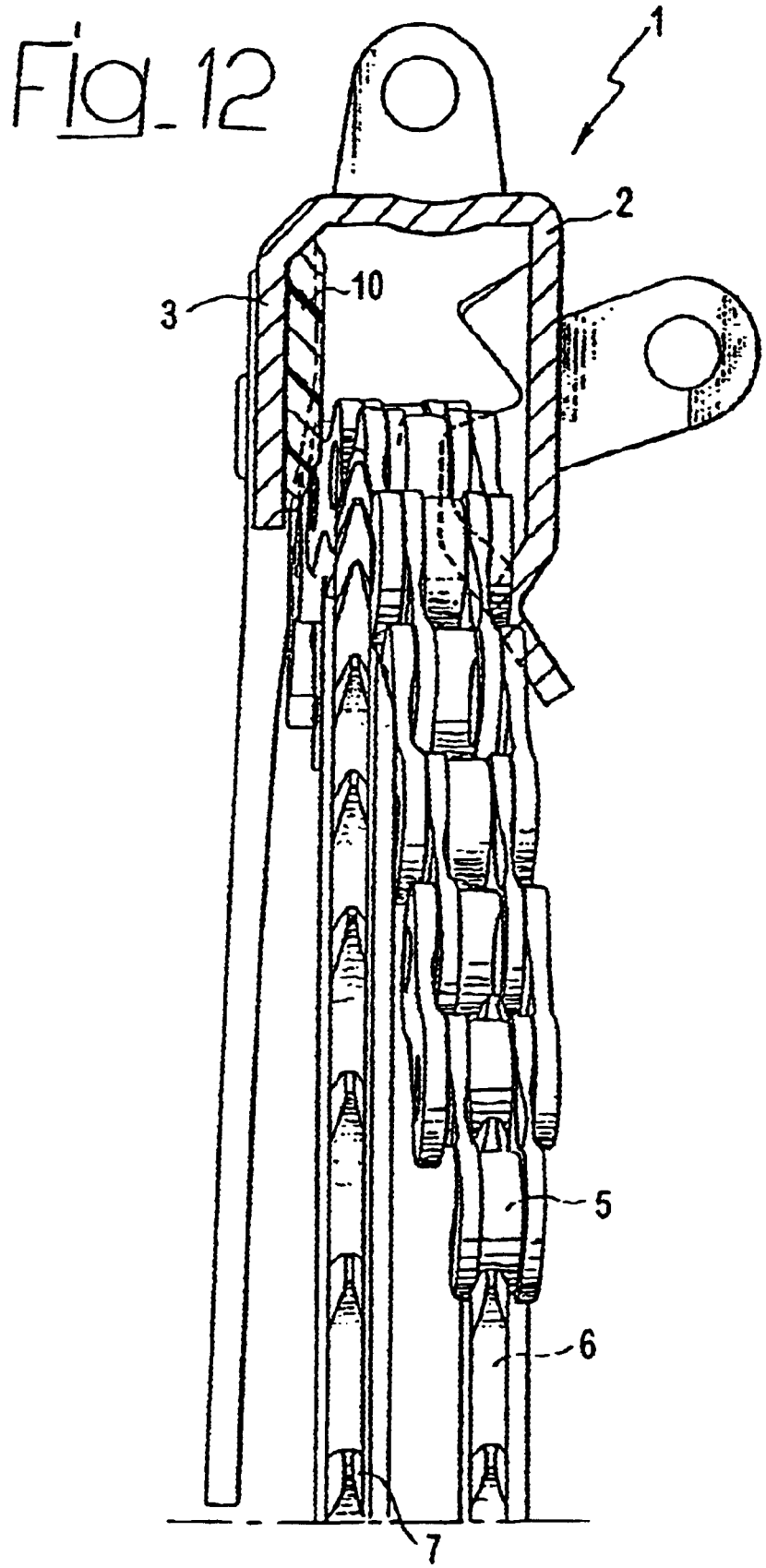

BICYCLE FRONT DERAILLEUR FORK AND DERAILLEUR COMPRISING THIS FORK

BACKGROUND OF THE INVENTION

The present invention relates in general to bicycle front derailleurs of the type comprising a fixed body provided with means for mounting it on a bicycle frame, and a moveable body connected to the fixed body in such a way as to be moveable between two extreme positions in order to shift a bicycle chain from one chainring to another in a series of chainrings of different diameters fitted to the bottom bracket of the bicycle, the said moveable body comprising a forked member consisting of a pair of substantially parallel plates joined at the top by a bridge portion.

The present invention relates in particular to the abovementioned forked member.

FIG. 1 of the accompanying drawings shows a cross section through a forked member 1 of conventional type comprising an inner plate 2 and an outer plate 3 joined at the top by a bridge portion 4. In this description, and in the claims that follow, the expressions "inner plate" and "outer plate" refer to the usual manner in which the front derailleur is mounted on the bicycle. In the conventional arrangement, the series of chainrings fitted to the bottombracket of the bicycle is on the right-hand side of the bicycle frame, with the larger-diameter chainrings on the outside. Correspondingly, the forked member possesses an inner plate next to the bicycle frame, and an outer plate on the side away from the bicycle, i.e next to the larger-diameter chainrings. FIG. 1 shows how the forked member 1 functions during the shifting of the chain 5 of the bicycle from a smaller-diameter chainring 6 to a larger-diameter chainring 7. During this process the chain is pushed by the inside face 2a of the inner plate 2 of the forked member 1 towards the larger-diameter chainring 7, which is spinning in the direction indicated by arrow A (FIG. 1 shows the chainrings as seen from the front of the bicycle). The combination of the abovementioned movements allows the links of the chain 5 to drop into the teeth of the larger-diameter chainring 7. However, in this final stage the chain 5 may come under such severe twisting that it passes completely over the teeth of the chainring 7 and ends up on the outside of the chainring 7, as illustrated in FIG. 2 (which is a top-down view of the forked member 1 and of the two chainrings 6, 7). Normally this possible problem is contained by correct adjustment of the travel of the derailleur by means of an end stop that determines the position of the inside face 3a of the outer plate 3 of the forked member 1. The adjusted position of the face 3a is determined partly in relation to the type of frame (width and length of the back end of the bicycle, number of sprockets mounted on the rear wheel hub, and the chain line due to the chainring). It should be remembered too that correct adjustment of the derailleur must allow the chain to take up the largest angels required by the number of sprockets fitted to the bicycle without touching the inside faces, as is obvious in FIG. 3 and in FIG. 4 which shows the detail marked IV in FIG. 3 on a larger scale.

In recent times, however, there has been a trend to use ever greater numbers of sprockets on the rear wheel hub, making it necessary to employ chains of reduced width. The adoption of narrower chains has led to the necessity of finding a more efficient solution to the problems explained above.

SUMMARY OF THE INVENTION

The object of the present invention is therefore to provide an efficient solution to the abovementioned problems that guarantees highly reliable operation of the derailleur and at the same time has an extremely simple, low-cost structure, leaving it still possible to adapt the derailleur easily and quickly to specific requirements arising from the use of a particular chain.

In order to achieve this object, the subject of the invention is a forked member for a bicycle front derailleur, of the type comprising a pair of substantially parallel plates joined at the top by a bridge portion, characterized in that that plate of the forked member which is to be located next to the larger-diameter chainrings is provided, on its inside face, facing the other plate, with an extra plate that locally reduces the gap between the two plates of the forked member.

The fitting of an extra plate rather than redesigning the derailleur from scratch to satisfy the demands set out above has the advantage that the derailleur can be easily adapted to any further design change by the simple replacement of the abovementioned extra plate.

This extra plate is preferably made of a plastic, preferably with a low coefficient of friction, and is joined by any suitable technique to the plate of the forked member.

In accordance with another preferred characteristic, the abovementioned extra plate has a lower bevel and at least one rear bevel (these terms referring to its position on the bicycle), the first bevel being designed to facilitate the transfer of the chain from the smaller-diameter chainring to the larger-diameter chainring, and the second bevel being designed to allow the chain to take up a highly inclined direction with respect to the central plane of the bicycle when meshing with the outermost sprocket of the hub of the rear wheel of the bicycle.

BRIEF DESCRIPTION OF THE DRAWINGS

These and other details and advantages of the invention will be made apparent in the description that follows with reference to the accompanying drawings, which are provided purely by way of non-restrictive example, in which:

FIG. 1 is a cross section through a forked member of a front derailleur according to the prior art, FIG. 2 is a plan view of the forked member of FIG. 1, FIG. 3 is a plan view illustrating the arrangement of a bicycle chain in accordance with the prior art, FIG. 4 is a larger-scale view of the detail indicated by arrow IV in FIG. 3, FIG. 5 is a perspective view of the inside face of the outer plate of the forked member according to the invention, FIG. 6 is an exploded view corresponding to the view seen in FIG. 5, FIGS. 7 and 8 are a front view and a bottom-up view of the plate seen in FIG. 5, FIG. 9 is a side view of the inside face of the plate of FIG. 5, in the operating condition, FIG. 10 is a plan view of the detail seen in FIG. 9, FIG. 11 is a larger-scale view of the detail indicated by arrow XI in FIG. 10, and FIG. 12 corresponds to FIG. 1 but includes the modification introduced by the present invention.

DETAILED DESCRIPTION OF THE INVENTION

Referring to FIGS. 5–12, in accordance with the invention an extra plate 10, preferably made of a plastic with a low coefficient of friction is mounted on the inside face 3a of the outer plate 3 of the forked member. As will be immediately obvious from an examination of FIG. 12, the extra plate 10 locally reduces the distance between the two plates 2, 3 of the forked member 1, thereby preventing the problem described above with reference to FIG. 2 from arising. The size and shape of the extra plate 10 are such as to guide the side of the outer links of the chain during shifting, to allow the chain to drop correctly into the teeth of the larger-diameter chainring. On its underside and rear side, the extra plate 10 has bevels 11, 12, 13. The bevel 11 serves to allow shifting of the chain before the latter drops into the teeth of the chainring. After completion of the shift, the bevels 12 and 13 allow the chain to pass through when at its maximum outward angles illustrated in FIG. 3. In the example illustrate, the extra plate 10 is fixed to the plate 3 of the forked member by having a projecting tooth that inserts into a hole of corresponding shape, indicated by reference number 14, in the plate 3 and engages with a plastic button 15. The extra plate 10 is also fixed to plate 3 by a hook portion (not numbered) which overlaps the peripheral edge of the plate 3 and prevents relative movement between the additional plate 10 and the plate 3. However, any method of fastening, (such as vulcanization, riveting or adhesive bonding for example) can be used. As already indicated, it is preferable to produce the extra plate 10 from an engineering polymer that it to say a wear-resistant resin that nonetheless has sufficient elasticity to allow it to be fitted in the manner described above.

Clearly, without prejudice to the principle of the invention, the details of construction and the forms of the embodiment may be varied considerably compared with those described and illustrated without thereby departing from the scope of the present invention.

What is claimed is:

1. Forked member for a bicycle front derailleur having smaller and larger chainrings, comprising interior and exterior substantially mutually parallel plates having a generally-planar surface, said exterior plate being located next to the larger-diameter chainring and having an aperture extending through its planar surface, said plates being joined at the top by a bridge portion, said exterior plate having on its inside face adjacent a rear end thereof, where "rear" refers to its position on the bicycle, an additional generally-planar plate that locally reduces the gap between the two plates of the forked member, said additional plate having a planar surface engaging the inside face of said exterior plate, and connecting means extending through said aperture in the planar surface of said exterior plate for connecting said additional plate to said exterior plate.

2. Forked member according to claim 1, wherein the abovementioned extra plate has a lower bevel, where "lower" refers to its position on the bicycle, the bevel assisting the shifting of the chain onto the larger-diameter chainrings.

3. Forked member according to claim 1, wherein the abovementioned extra plate has at least one rear bevel, the bevel assisting the inclined disposition of the bicycle chain as the latter meshes with the outermost sprocket on the hub of the rear wheel of the bicycle.

4. Forked member according to claim 1, wherein said additional plate is provided with a hook portion engaging a complimentary portion of said one of said plates to prevent relative movement between said additional plate and said one of said plates.

5. Bicycle front derailleur, wherein it includes a forked member according to claim 1.

6. Forked member for a bicycle derailleur having smaller and larger chainrings, comprising a pair of substantially mutually parallel elongated plates joined at the top by a bridge portion wherein a first plate is located next to the larger-diameter chainrings and is provided on an inside surface with an additional plate of predetermined thickness that reduces a gap between said plates of the forked member by a predetermined amount, said additional plate and said first plate being connected by connecting means extending through an aperture in the planar surface of the first plate.

7. Forked member according to claim 6 wherein said additional, detachable plate is made of plastic material with a low coefficient of friction.

8. Forked member according to claim 6 wherein said additional plate has a bevel adjacent a lower edge thereof for assisting the shifting of a chain onto the larger diameter chainrings.

9. Forked member according to claim 6 wherein said additional plate has at least one rear bevel for assisting an inclined disposition of a bicycle chain as the chain meshes with an outermost sprocket on a hub of a rear wheel of a bicycle.

10. Forked member for a bicycle front derailleur, comprising a pair of substantially mutually parallel elongated plates joined at the top by a bridge portion wherein one of said plates of the forked member, which is to be next to the larger-diameter chainrings is provided between said plates on an inside surface of said one of said plates with an additional, detachable plate of predetermined thickness that locally reduces a gap between said plates of the forked member by a predetermined amount.

11. Forked member according to claim 10 wherein said additional, detachable plate is made of plastic material with a low coefficient of friction.

12. Forked member according to claim 10 wherein said additional plate has a bevel adjacent a lower edge thereof for assisting the shifting of a chain onto the larger diameter chainrings.

13. Forked member according to claim 10 wherein said additional plate has at least one rear bevel for assisting an inclined disposition of a bicycle chain as the chain meshes with an outermost sprocket on a hub of a rear wheel of a bicycle.

14. A bicycle front derailleur comprising a forked member for a bicycle front derailleur having smaller and larger chainrings, comprising a pair of substantially mutually parallel elongated plates joined at the top by a bridge portion wherein a first plate is located next to the larger-diameter chainrings and is provided on an inside surface with an additional plate of predetermined thickness that reduces a gap between said plates of the forked member by a predetermined amount, said additional plate and said first plate being connected by connecting means extending through an aperture in the planar surface of the first plate.

15. Forked member according to claim 14 wherein said additional, detachable plate is made of a plastic material with a low coefficient of friction.

16. Forked member according to claim 14 wherein said additional plate has a bevel adjacent a lower edge thereof for assisting the shifting of a chain onto the large diameter chainrings.

17. Forked member according to claim 14 wherein said additional plate has at least one rear bevel for assisting an inclined disposition of a bicycle chain as the chain meshes with an outermost sprocket on a hub of a rear wheel of a bicycle.

18. A bicycle front derailleur comprising a forked member for a bicycle front derailleur, comprising a pair of substantially mutually parallel elongated plates joined at the top by a bridge portion wherein one of said plates of the forked member, which is to be next to the larger-diameter chainrings is provided between said plates on an inside surface of said one of said plates with an additional, detachable plate of predetermined thickness that locally reduces a gap between said plates of the forked member by a predetermined amount.

19. Forked member according to claim 18 wherein said additional, detachable plate is made of a plastic material with a low coefficient of friction.

20. Forked member according to claim 18 wherein said additional plate has a bevel adjacent a lower edge thereof for assisting the shifting of a chain onto the larger diameter chainrings.

21. Forked member according to claim 18 wherein said additional plate has at least one rear bevel for assisting an inclined disposition of a bicycle chain as the chain meshes with an outermost sprocket on a hub of a rear wheel of a bicycle.

22. A replaceable adapter for a standard front derailleur fork of a bicycle having multiple front chainrings, the standard derailleur fork including an interior and exterior plate having generally-planar surfaces, the plates being substantially parallel and joined at the top by a bridge portion, the plates extending generally parallel to the frame of the bicycle and having rear and front ends facing the rear and front ends of the bicycle, respectively, the exterior plate having at least one aperture extending through its planar surface, said adapter comprising:

a removable adapter plate having a generally-planar connecting surface, a chain-guiding surface with at least one bevel, and a peripheral shape which compliments at least a portion of the shape of the exterior plate; and, connecting means adapted to extend through the aperture in the planar surface of the exterior plate for statically but replaceably connecting said adapter plate to the exterior plate with the connecting surface of the adapter plate in contact with the interior surface of the exterior plate;

wherein said adapter plate provides a plurality of reduced interior widths between said adapter plate and the interior plate through which the chain of the bicycle travels during gear shifting.

23. The adapter recited in claim 22, wherein said connecting means has a shape that compliments the shape of the aperture.

24. The adapter recited in claim 23, wherein said connecting means comprises a projecting tooth extending generally perpendicular from said connecting surface and through the aperture in the exterior plate, said tooth having a peripheral shape which compliments the peripheral shape of the aperture.

25. The adapter recited in claim 23, wherein said connecting means comprises a projecting tooth extending generally perpendicular from said connecting surface and through the aperture in the exterior plate, including a button which connects to the free end of said tooth, at least a portion of said button having a peripheral shape which compliments the peripheral shape of the aperture.

26. The adapter recited in claim 22, further including a hook portion extending from said connecting surface of said adapter plate, said hook portion adapted to overlap the peripheral edge of the exterior plate.

27. The adapter recited in claim 22, wherein said bevel is located on the lower edge of said chain-guiding surface, said bevel creating an enlarged gap for the chain when shifting from one chainring to a larger diameter chainring.

28. The adapter recited in claim 27, further including a second bevel on the rear end of said chain-guiding surface, said bevel creating an enlarged gap for the chain when shifting from one sprocket to a smaller sprocket on the rear wheel of the bicycle.

29. The adapter recited in claim 22, wherein said adapter plate is constructed of an elastic and wear-resistant polymer.

30. An adapter for modifying an existing front derailleur fork of a bicycle having multiple front chainrings, the existing derailleur fork including spaced apart interior and exterior plates, each of which has inner and outer surfaces between which a first chain having a first predetermined thickness passes with a predetermined distance between the chain and the plates, for use with a second chain having a second predetermined thickness less than the first predetermined thickness, the adapter comprising:

a plate having an exterior chain guiding surface with at least one bevel, an interior surface configured to compliment at least a portion of the inner surface of a selected one of the plates with the bevel facing the chain, and a maximum thickness which is less than the difference between the first chain's predetermined thickness and the second chain's predetermined thickness; and, fastening means for securing the adaptor to the selected plate, whereby the adapter plate reduces the space between it and the inner surface of the non selected plate by an amount no greater than the difference.

31. A modified front derailleur and front derailleur fork combination comprised of:

a front derailleur with multiple chainrings, a derailleur fork including spaced apart interior and exterior plates, each of which has inner and outer surfaces between which a first chain of the front derailleur having a first predetermined thickness passes with a predetermined distance between the first chain and the plates, for use with a second chain having a second predetermined thickness less than the first predetermined thickness, and an adaptor having an exterior chain guiding surface with at least one bevel, an interior surface configured to compliment at least a portion of the inner surface of a selected one of the plates with the bevel facing the chain, and a maximum thickness which is less than the difference between the first and second chain's predetermined thicknesses; and, fastening means securing the adaptor to the selected plate.

* * * * *